(12) United States Patent
Sagae et al.

(10) Patent No.: US 9,351,263 B2
(45) Date of Patent: May 24, 2016

(54) USER EQUIPMENT AND METHOD

(71) Applicant: NTT DOCOMO, INC., Tokyo (JP)

(72) Inventors: Yuta Sagae, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/648,094

(22) PCT Filed: Nov. 27, 2013

(86) PCT No.: PCT/JP2013/081878
§ 371 (c)(1),
(2) Date: May 28, 2015

(87) PCT Pub. No.: WO2014/084245
PCT Pub. Date: Jun. 5, 2014

(65) Prior Publication Data
US 2015/0296464 A1 Oct. 15, 2015

(30) Foreign Application Priority Data

Nov. 29, 2012 (JP) .................................. 2012-261725

(51) Int. Cl.
*H04B 7/00* (2006.01)
*H04W 52/36* (2009.01)
*H04W 52/34* (2009.01)

(52) U.S. Cl.
CPC ............ *H04W 52/367* (2013.01); *H04W 52/34* (2013.01); *Y02B 60/50* (2013.01)

(58) Field of Classification Search
USPC ........................ 455/522, 69–70; 370/310–320
See application file for complete search history.

(56) References Cited

U.S. PATENT DOCUMENTS

| 6,751,448 B1 * | 6/2004 | Frydman | .............. H03G 3/3047 455/126 |
| 2015/0031410 A1 * | 1/2015 | Lim | ..................... H04W 52/146 455/522 |

OTHER PUBLICATIONS

International Search Report issued in PCT/JP2013/081878 mailed on Feb. 10, 2014 (2 pages).

(Continued)

*Primary Examiner* — Fayyaz Alam
(74) *Attorney, Agent, or Firm* — Osha Liang LLP

(57) ABSTRACT

One objective of the present invention is to determine an allowed range of transmission power in relaxation of the transmission power of a user equipment. One aspect of the present invention relates to a user equipment comprising: a transmission power lower bound value calculation unit configured to calculate a lower bound value of transmission power of the user equipment by applying a power relaxation factor for relaxing the transmission power; a transmission power upper bound value calculation unit configured to calculate an upper bound value of the transmission power; an allowed transmission power range determination unit configured to calculate tolerances of the calculated lower bound value and upper bound value to compensate for the applied power relaxation factor and determine an allowed range of the transmission power based on the calculated tolerances; and a transmission power determination unit configured to determine the transmission power within the determined allowed range of transmission power, wherein the allowed transmission power range determination unit determines the allowed range of transmission power to compensate for the applied power relaxation factor.

5 Claims, 5 Drawing Sheets

| $P_{CMAX}$ (dBm) | Tolerance $T(P_{CMAX})$ (dB) |
|---|---|
| $21 \leq P_{CMAX} \leq 23$ | 2.0 |
| $20 \leq P_{CMAX} < 21$ | 2.5 |
| $19 \leq P_{CMAX} < 20$ | 3.5 |
| $18 \leq P_{CMAX} < 19$ | 4.0 |
| $13 \leq P_{CMAX} < 18$ | 5.0 |
| $8 \leq P_{CMAX} < 13$ | 6.0 |
| $-40 \leq P_{CMAX} < 8$ | 7.0 |

(56) References Cited

OTHER PUBLICATIONS

Written Opinion of the International Searching Authority issued in PCT/JP2013/081878 mailed on Feb. 10, 2014 (4 pages).

3GPP TS 36.101 V11.2.0; "3rd Generation Partnership Project; Technical Specification Group Radio Access Network; Evolved Universal Terrestrial Radio Access (E-UTRA); User Equipment (UE) radio transmission and reception (Release 11)", Sep. 2012 (359 pages).

* cited by examiner

FIG.1

| $P_{CMAX}$ (dBm) | Tolerance $T(P_{CMAX})$ (dB) |
|---|---|
| $21 \leq P_{CMAX} \leq 23$ | 2.0 |
| $20 \leq P_{CMAX} < 21$ | 2.5 |
| $19 \leq P_{CMAX} < 20$ | 3.5 |
| $18 \leq P_{CMAX} < 19$ | 4.0 |
| $13 \leq P_{CMAX} < 18$ | 5.0 |
| $8 \leq P_{CMAX} < 13$ | 6.0 |
| $-40 \leq P_{CMAX} < 8$ | 7.0 |

FIG.4

| $P_{CMAX}$ (dBm) | Tolerance $T(P_{CMAX})$ (dB) |
|---|---|
| $21 - \Delta T_{LTE} \leq P_{CMAX} \leq 23$ | 2.0 |
| $20 - \Delta T_{LTE} \leq P_{CMAX} < 21 - \Delta T_{LTE}$ | 2.5 |
| $19 - \Delta T_{LTE} \leq P_{CMAX} < 20 - \Delta T_{LTE}$ | 3.5 |
| $18 - \Delta T_{LTE} \leq P_{CMAX} < 19 - \Delta T_{LTE}$ | 4.0 |
| $13 - \Delta T_{LTE} \leq P_{CMAX} < 18 - \Delta T_{LTE}$ | 5.0 |
| $8 - \Delta T_{LTE} \leq P_{CMAX} < 13 - \Delta T_{LTE}$ | 6.0 |
| $-40 - \Delta T_{LTE} \leq P_{CMAX} < 8 - \Delta T_{LTE}$ | 7.0 |

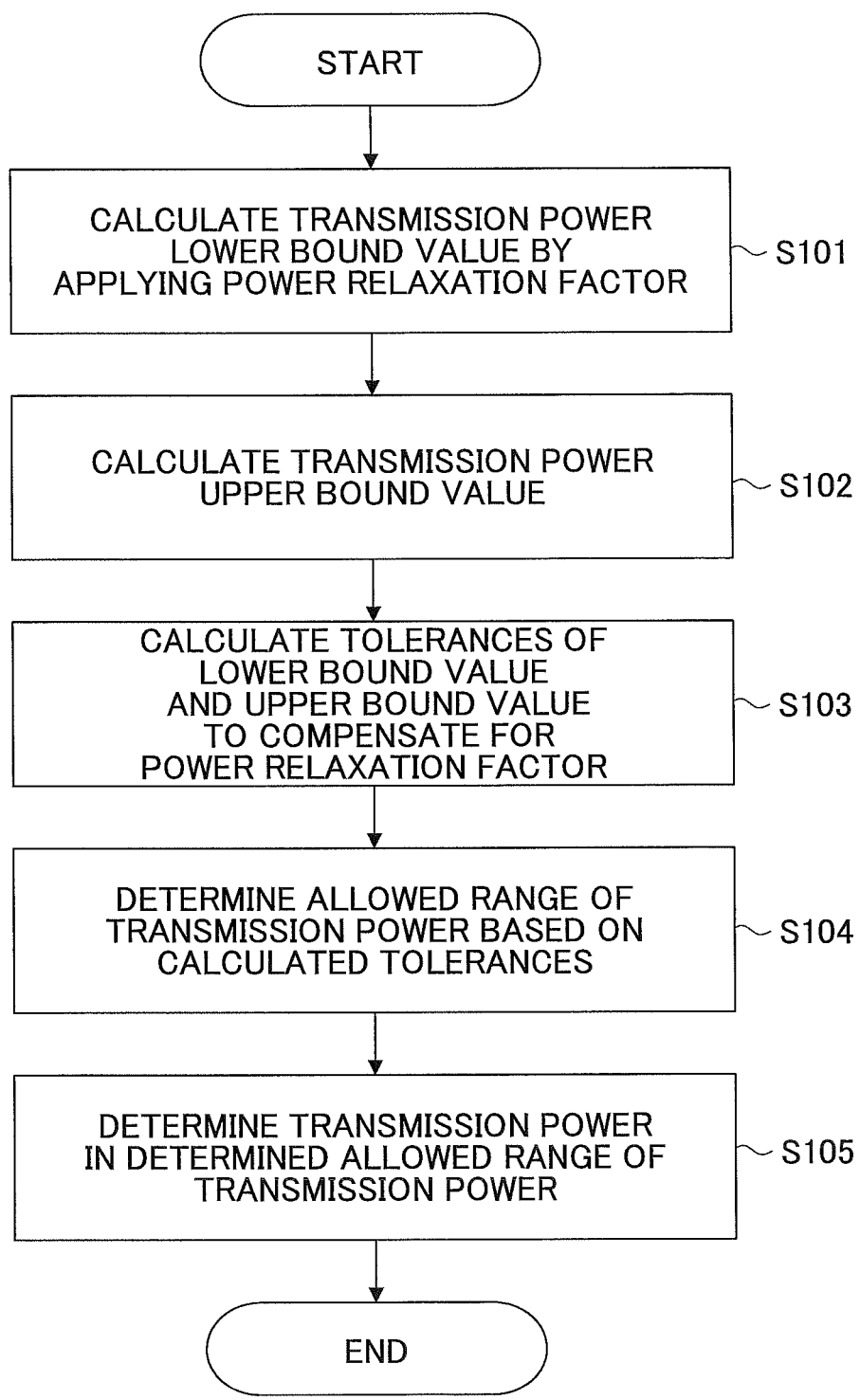

USER EQUIPMENT AND METHOD

TECHNICAL FIELD

The present invention generally relates to a radio communication system and more particularly relates to a user equipment for use in the radio communication system.

BACKGROUND ART

Presently, as a development of LTE (Long Term Evolution) scheme, standardization of a LTE-Advanced scheme is progressed in a standard group 3GPP (3rd Generation Partnership Project). In 3GPP TS 36.101 (V 11.2.0) published in September 2012, it has been specified that the maximum transmission power $P_{CMAX}$ that a user equipment (UE) is allowed to output for uplink transmission is determined within the range, $$P_{CMAX\_L} \leq P_{CMAX} \leq P_{CMAX\_H}.$$

Here, the lower bound value $P_{CMAX\_L}$ and the upper bound value $P_{CMAX\_L}$ are defined as follows, $$P_{CMAX\_L} = \text{MIN}\{P_{EMAX} - \Delta T_C, P_{PowerClass} - \text{MAX}(MPR + A\text{-}MPR, P\text{-}MPR) - \Delta T_C\} \text{ and}$$

$$P_{MAX\_H} = \text{MIN}\{P_{EMAX}, P_{PowerClass}\},$$

where $P_{EMAX}$ represents the maximum transmission power of the UE indicated from a network side, $\Delta T_C$ represents an allowed relaxation amount when the user equipment uses a resource block in an edge of a frequency band, $P_{PowerClass}$ represents the maximum transmission power that should be supported by the UE, MPR (Maximum Power Reduction) represents an allowed relaxation amount specified by a modulation scheme (for example, QPSK) and the number of resource blocks, A-MPR (Additional Maximum Power Reduction) represents an allowed relaxation amount to avoid providing interference to other adjacent systems, P-MPR (Power-Maximum Power Reduction) represents a power relaxation factor to satisfy an applicable electromagnetic energy absorption requirement such as a SAR (Specific Absorption Rate) provision allowed for a human body.

The maximum transmission power $P_{CMAX\_H}$ of UE is determined within the range between the lower bound value $P_{CMAX\_L}$ and the upper bound value $P_{CMAX\_H}$ as calculated in this manner, and the transmission power of UE is determined such that it cannot exceed the maximum transmission power $P_{CMAX}$.

Meanwhile, the maximum transmission power $P_{CMAX}$ is allowed to include an error in practice, and a measurement value $P_{UMAX}$ of the maximum transmission power is specified in consideration of a margin or a tolerance to the maximum transmission power $P_{CMAX}$ as follows, $$P_{CMAX\_L} - T(P_{CMAX\_L}) \leq P_{UMAX} \leq P_{CMAX\_H} + T(P_{CMAX\_H}),$$

where $T(P_{CMAX\_L})$ and $T(P_{CMAX\_H})$ are determined from the calculated $P_{CMAX\_L}$ and $P_{CMAX\_H}$ in accordance with a table indicative of correspondence between $P_{CMAX}$ and tolerances as illustrated in FIG. 1. As can be seen in FIG. 1, it is specified that as $P_{CMAX}$ is smaller, the tolerance $T(P_{CMAX})$ is greater.

SUMMARY OF INVENTION

Problem to be Solved by the Invention

Meanwhile, some filtering means such as a duplexer (or a diplexer) for separating between a signal in a reception frequency band and a signal in a transmission frequency band are typically provided in a user equipment. In some cases where the frequency bands for separation are closely located, however, it is difficult to use a diplexer to filter the individual frequency bands appropriately. Also, in a LTE-Advanced system, it is considered that carrier aggregation (CA) is introduced. To this end, a user equipment supporting CA is required to have an ability of separating signals in multiple frequency bands referred to as component carriers (CCs) appropriately, and additional insertion of a diplexer is considered.

In general, the filtering means such as a duplexer and a diplexer are required to have low loss characteristics and high power tolerance characteristics. The high power tolerance characteristics are to avoid occurrence of discharge due to a high level of power entering the filtering means. On the assumption of this situation, it is considered in the LTE and the LTE-Advanced that the transmission power of a user equipment is relaxed in consideration of the power tolerance characteristics of the filtering means. For example, although the maximum transmission power for a Power Class 3 terminal is normally 23 dBm +/−2 dB, the tolerance to the maximum transmission power is changed in some bands (for example, Band 22, Band 42/43 and so on as described in TS 36.101 Table 6.2.2-1: UE Power Class). However, details on relaxation of transmission power to suppress a high level of power incoming to the filtering means have not been determined yet. Particularly, no specification on the measurement value $P_{UMAX}$ of transmission power in relaxation of the transmission power in consideration of the power tolerance characteristics of filtering means has been discussed yet. Accordingly, the power tolerance characteristics of filtering means cannot be appropriately considered, which may result in increasing output of a transmission amplifier in a terminal device.

In light of the above problem, one objective of the present invention is to provide some techniques for determining an allowed range of transmission power in relaxation of the transmission power of a user equipment.

Means for Solving the Problem

In order to overcome the above problem, one aspect of the present invention relates to a user equipment comprising: a transmission power lower bound value calculation unit configured to calculate a lower bound value of transmission power of the user equipment by applying a power relaxation factor for relaxing the transmission power; a transmission power upper bound value calculation unit configured to calculate an upper bound value of the transmission power; an allowed transmission power range determination unit configured to calculate tolerances of the calculated lower bound value and upper bound value to compensate for the applied power relaxation factor and determine an allowed range of the transmission power based on the calculated tolerances; and a transmission power determination unit configured to determine the transmission power within the determined allowed range of transmission power.

Advantage of the Invention

According to the above-mentioned aspect, the allowed range of transmission power in relaxation of the transmission power of a user equipment can be determined.

BRIEF DESCRIPTION OF DRAWINGS

FIG. 1 illustrates a table indicative of conventional correspondence between $P_{CMAX}$ and tolerances;

FIG. 4 illustrates a table indicative of correspondence between $P_{CMAX}$ and tolerances according to one embodiment of the present invention; and FIG. 5 is a flowchart for illustrating an operation in a user equipment according to one embodiment of the present invention.

EMBODIMENTS OF THE INVENTION

Embodiments of the present invention are described below with reference to the drawings.

In embodiments described below, a user equipment that can communicate in a single frequency band or multiple frequency bands is disclosed. Some filtering means are provided in the user equipment, such as a duplexer (or a diplexer) for separating between an uplink signal and a downlink signal in an identical frequency band and a diplexer for separating respective signals in individual frequency bands. A power relaxation factor of the user equipment is introduced in consideration of power tolerance characteristics of the filtering means, and the transmission power of the user equipment is relaxed. Furthermore, an allowed range of transmission power is determined to compensate for the introduced power relaxation factor such that the allowed range for use in determining the actual transmission power of the user equipment cannot be affected by the power relaxation factor. As a result, it is possible to avoid a possibility that the transmission power may become too low in association with introduction of the power relaxation factor.

At the outset, a radio communication system according to one embodiment of the present invention is described with reference to FIG. 2. The radio communication system according to this embodiment is a LTE-Advanced system where carrier aggregation (CA) technique may be utilized in radio communication. In the CA, multiple carriers referred to as component carriers (CCs) are simultaneously used in communication so as to achieve wideband transmission. However, the user equipment according to the present invention is not limited to the LTE-Advanced system and may be applied to any appropriate radio communication system where an allowed range of transmission power of the user equipment is determined to compensate for reduction in the transmission power in relaxation of the transmission power. In other words, the user equipment according to the present invention may be applied to a LTE system, that is, any appropriate radio communication system where the allowed range of transmission power of the user equipment is determined in a single frequency band to compensate for reduction in the maximum transmission power in consideration of the power relaxation factor in a diplexer.

Figure 2:
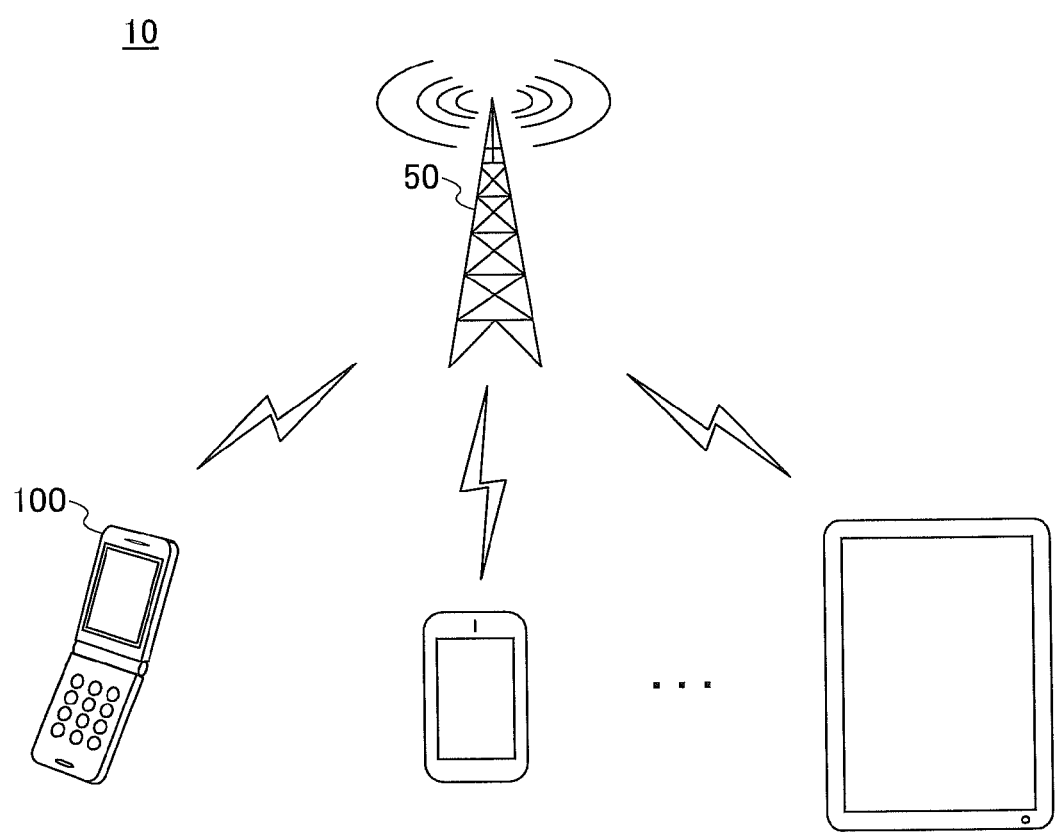
FIG. 2 illustrates a radio communication system according to one embodiment of the present invention.

FIG. 2 illustrates a radio communication system according to one embodiment of the present invention. As illustrated in FIG. 2, the radio communication system 10 has a base station (eNB) 50 and a user equipment (UE) 100.

The base station 50 serves one or more cells covering certain geographical areas and communicatively connects to the user equipment 100 via the cells. In the LTE-Advanced, the base station 50 supports the CA function, assigns one or more CCs to the user equipment 100 and uses these CCs simultaneously to communicate with the user equipment 100. In the illustrated embodiment, the only one base station 50 is illustrated, but multiple base stations 50 are typically disposed to cover a service area of the radio communication system 10.

The user equipment 100 is typically an information processing device such as a mobile phone terminal, a smartphone, a tablet and a personal computer and wirelessly communicates with the base station 50 via multiple frequency bands. In the LTE-Advanced, one or more CCs from the base station 50 are assigned to the user equipment 100, and the user equipment 100 can use them simultaneously for communication.

The user equipment 100 typically consists of one or more of various hardware resources such as an auxiliary storage device, a memory device, a CPU (Central Processing Unit), a communication device, a display device and an input device. The auxiliary storage device consists of a hard disk, a flash memory and so on and stores programs and data for implementing various operations as stated below. The memory device consists of a RAM (Random Access Memory) and so on and upon an instruction for activating a program, loads the program from the auxiliary storage device for storage. The CPU serves as a processor for processing information and implements various functions as stated below in accordance with programs stored in the memory device. The communication device consists of various communication circuits for connecting to other devices such as a server via a network in a wired and/or wireless manner. In the user equipment 100 that can conduct communication using multiple frequency bands simultaneously, the communication device has some filtering means such as a diplexer for separating respective signals in multiple frequency bands. In conjunction with the filtering means, some problems on power tolerance characteristics are known, for example, if high transmission power is used in the user equipment 100, reception may be prevented. The display device and the input device provide a user interface between the user equipment 100 and a user.

Next, an arrangement of the user equipment according to one embodiment of the present invention is described with reference to FIGS. 3-4. In this embodiment, the user equipment 100 for use in a LTE system and a LTE-Advanced system is described. In the LTE system and the LTE-Advanced system, it is specified that the user equipment 100 transmits a radio signal to the base station 50 at transmission power less than or equal to the maximum transmission power $P_{CMAX}$ determined within a range from the lower bound value $P_{CMAX\_L}$ to the upper bound value $P_{CMAX\_H}$. Also, the determined transmission power $P_{CMAX}$ is allowed to include an error, and a measurement value $P_{UMAX}$ of the transmission power in consideration of a tolerance to the transmission power $P_{CMAX}$ is used to set the transmission power in practice.

In this embodiment, a power relaxation factor $\Delta T_{LTE}$ for additionally relaxing the maximum transmission power $P_{CMAX}$ is newly introduced to avoid supplying a high level of power to a filtering means for separating respective signals in multiple frequency bands, such as a diplexer, installed in the user equipment 100 in the LTE system. In addition, a tolerance $T(P_{CMAX})$ corresponding to $P_{CMAX}$ determined by introducing the power relaxation factor $\Delta T_{LTE}$ is determined to compensate for reduction due to the power relaxation factor $\Delta T_{LTE}$. As a result, it is possible to take the power tolerance characteristics of the filtering means into consideration as well as to avoid unnecessary increasing the tolerance $T(P_{CMAX})$ to $P_{CMAX}$ determined by introducing the power relaxation factor $\Delta T_{LTE}$. Accordingly, excessive reduction in the transmission power due to the introduction of the power relaxation factor $\Delta T_{LTE}$ can be avoided, and it is possible to prevent the transmission power from being too low.

Figure 3:
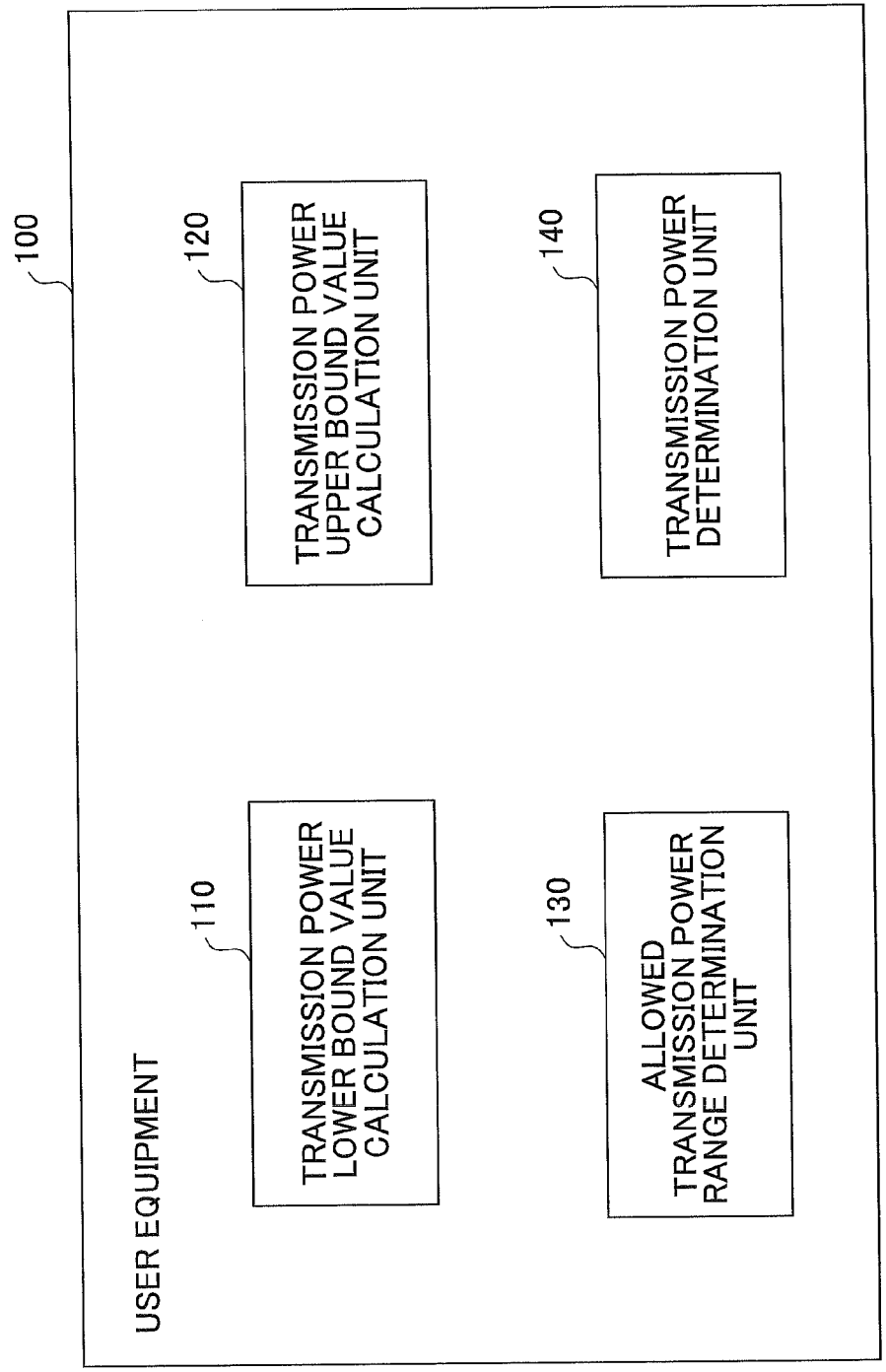
FIG. 3 illustrates an arrangement of a user equipment according to one embodiment of the present invention.

FIG. 3 illustrates an arrangement of a user equipment according to one embodiment of the present invention. As illustrated in FIG. 3, the user equipment 100 includes a transmission power lower bound value calculation unit 110, a transmission power upper bound value calculation unit 120, an allowed transmission power range determination unit 130 and a transmission power determination unit 140.

The transmission power lower bound value calculation unit 110 calculates a lower bound value of transmission power of the user equipment 100 by applying a power relaxation factor for relaxing the transmission power. Specifically, the transmission power lower bound value calculation unit 110 calculates the lower bound value $P_{CMAX\_L}$ of the maximum transmission power $P_{CMAX}$ of the user equipment 100 in accordance with the formula as follows, $$P_{CMAX\_L} = \text{MIN}\{P_{EMAX} - \Delta T_C, P_{PowerClass} - \text{MAX}(MPR + A - MPR + \Delta T_{LTE}, P - MPR) - \Delta T_C\},$$

where, as stated above, $P_{EMAX}$ represents the maximum transmission power of the UE indicated from a network side, $\Delta T_C$ represents an allowed relaxation amount when the user equipment 100 uses a resource block in an edge of a frequency band, $P_{PowerClass}$ represents the maximum transmission power that should be supported by the UE, MPR (Maximum Power Reduction) represents an allowed relaxation amount specified by a modulation scheme (for example, QPSK) and the number of resource blocks, A-MPR (Additional Maximum Power Reduction) represents an allowed relaxation amount to avoid providing interference to other adjacent systems, P-MPR (Power-Maximum Power Reduction) represents a power relaxation factor to satisfy an applicable electromagnetic energy absorption requirement such as a SAR (Specific Absorption Rate) provision allowed for a human body.

In order to set the transmission power of a signal passing through a diplexer in the user equipment 100 to $P_{PowerClass}$, it is necessary to increase input power to an input end of a duplexer and a diplexer by the amount of the power relaxation factor only for the signal and improve performance of a transmission amplifier. In order to decrease the input power, that is, to decrease the transmission power, $\Delta T_{LTE}$ is a power relaxation factor for additionally relaxing the transmission power to avoid supplying a high level of power. The diplexer is a filtering means for separating between signals in a transmission frequency band and a signal in a reception frequency band, and the power relaxation factor $\Delta T_{LTE}$ may be determined based on the power tolerance characteristics of the diplexer. For example, the power relaxation factor $\Delta T_{LTE}$ may be set to be a value such that the maximum transmission power $P_{CMAX}$ cannot degrade reception performance of the diplexer installed in the user equipment 100 or such that a predefined reception quality can be ensured.

The transmission power lower bound value calculation unit 110 indicates the calculated $P_{CMAX\_L}$ to the allowed transmission power range determination unit 130.

The transmission power upper bound value calculation unit 120 calculates an upper bound value of the transmission power of the user equipment 100. Specifically, the transmission power upper bound value calculation unit 120 calculates the upper bound value $P_{CMAX\_H}$ of the transmission power $P_{CMAX}$ in accordance with the formula as follows, $$P_{CMAX\_H} = \text{MIN}\{P_{EMAX}, P_{PowerClass}\}.$$

The transmission power upper bound value calculation unit 120 indicates the calculated $P_{CMAX\_H}$ to the allowed transmission power range determination unit 130.

Upon receiving the calculated lower bound value and upper bound value from the transmission power lower bound value calculation unit 110 and the transmission power upper bound value calculation unit 120, respectively, the allowed transmission power range determination unit 130 calculates respective tolerances of the lower bound value and the upper bound value to compensate for the applied power relaxation factor and determines an allowed range of the transmission power based on the calculated tolerances. Specifically, the allowed transmission power range determination unit 130 determines a range of a measurement value $P_{UMAX}$ of the transmission power including an allowed measurement error of $P_{CMAX}$ based on $P_{CMAX\_L}$ indicated from the transmission power lower bound value calculation unit 110 and $P_{CMAX\_H}$ indicated from the transmission power upper bound value calculation unit 120.

In one embodiment, the allowed transmission power range determination unit 130 has correspondence information between the transmission power and the tolerances. In this embodiment, the correspondence information is specified to compensate for reduction in the transmission power due to the power relaxation factor, as illustrated in FIG. 4. As is apparent from comparison with the correspondence information illustrated in FIG. 1, according to the correspondence information in FIG. 4, a reduced amount of $P_{CMAX}$ reduced by applying the power relaxation factor $\Delta T_{LTE}$ is compensated for or added, and values resulting in addition of $\Delta T_{LTE}$ to $P_{CMAX}$ calculated by applying the power relaxation factor $\Delta T_{LTE}$ are associated with tolerances. As stated above, the power relaxation factor $\Delta T_{LTE}$ is introduced to relax the transmission power in consideration of power tolerance characteristics of a filtering means such as a diplexer, and this relaxation effect does not have to be introduced to set the allowed range. Supposedly, if the conventional correspondence between $P_{CMAX}$ and the tolerances as illustrated in FIG. 1 is applied to $P_{CMAX\_L}$ where the power relaxation factor $\Delta T_{LTE}$ has been introduced, $P_{CMAX\_L}$ would be classified into a smaller value range (a lower range in the table), and the corresponding tolerance $T(P_{CMAX\_L})$ would be a greater value. From this reason, the lower bound value $(P_{CMAX\_L} - T(P_{CMAX\_L}))$ of the measurement value $P_{UMAX}$ of the transmission power would be a smaller value, and $\Delta T_{LTE}$ introduced to relax the transmission power would enlarge the allowed range downward. As a result, there may arise a possibility that the transmission power of the user equipment 100 may become too low. By using the correspondence information for compensating for the reduction due to the power relaxation factor $\Delta T_{LTE}$ as illustrated in FIG. 4, it is possible to avoid variations of the range of the measurement value $P_{UMAX}$ of the transmission power due to the introduction of the power relaxation factor $\Delta T_{LTE}$.

Upon receiving the calculated lower bound value and upper bound value from the transmission power lower bound value calculation unit 110 and the transmission power upper bound value calculation unit 120, respectively, the allowed transmission power range determination unit 130 determines respective tolerances of the lower bound value and the upper bound value based on the correspondence information and determines an allowed range of transmission power based on the determined tolerances. In one embodiment, the allowed transmission power range determination unit 130 may determine the allowed range of the transmission power by enlarging a range of the transmission power specified by the lower bound value and the upper bound value by the determined tolerances of the lower bound value and the upper bound value.

Specifically, the allowed transmission power range determination unit 130 determines a tolerance $T(P_{CMAX\_L})$ of $P_{CMAX\_L}$ and a tolerance $T(P_{CMAX\_H})$ of $P_{CMAX\_H}$ based on the correspondence information specified to compensate for reduction of $P_{CMAX}$ due to the power relaxation factor $\Delta T_{LTE}$. Then, the allowed transmission power range determination unit 130 determines the range of the measurement value $P_{UMAX}$ of the maximum transmission power in accordance with the formula as follows, $$P_{CMAX\_L} - T(P_{CMAX\_L}) \le P_{UMAX} \le P_{CMAX\_H} + T(P_{CMAX\_H}).$$

The allowed transmission power range determination unit 130 indicates the determined range of $P_{UMAX}$ to the transmission power determination unit 140.

The transmission power determination unit 140 sets the transmission power within the range of the measurement value $P_{UMAX}$ of the transmission power indicated from the allowed transmission power range determination unit 130.

In the case where the user equipment 100 is used in a LTE-Advanced system and carrier aggregation is applied, $\Delta T_{IBC}$ is introduced to take a loss of an additional diplexer into account. Similar to the above-stated manner, for a component carrier (CC) assigned by the base station 50, the user equipment 100 may determine a range of a measurement value $P_{UMAX,C}$ of transmission power of the CC. Specifically, the user equipment 100 may calculate a transmission power lower bound value $P_{CMAX\_L,C}$ and a transmission power upper bound value $P_{CMAX\_H,C}$ for the CC assigned by the base station 50 and determine the measurement value $P_{UMAX,C}$ of the transmission power for the CC based on respective tolerances corresponding to the calculated $P_{CMAX\_L,C}$ and $P_{CMAX\_H,C}$. In this embodiment, by using correspondence information to compensate for reduction due to $\Delta T_{IBC}$ instead of the power relaxation factor $\Delta T_{LTE}$ as illustrated in FIG. 4, it is possible to avoid variations of a range of the measurement value $P_{UMAX}$ of the transmission power due to the introduction of the power relaxation factor.

Next, operations of the user equipment according to one embodiment of the present invention are described with reference to FIG. 5. FIG. 5 is a flowchart for illustrating an operation of the user equipment according to one embodiment of the present invention. This operation starts upon occurrence of a data transmission event from the user equipment 100 to the base station 50, for example.

As illustrated in FIG. 5, at step S101, the user equipment 100 calculates a lower bound value of transmission power of the user equipment 100 by applying a power relaxation factor for relaxing the transmission power. Specifically, the transmission power lower bound value calculation unit 110 calculates $P_{CMAX\_L}$ by applying the power relaxation factor $\Delta T_{IBC}$, that is, in accordance with the formula as follows, $$P_{CMAX\_L} = \mathrm{MIN}\{P_{EMAX} - \Delta T_C, P_{PowerClass} - \mathrm{MAX}(MPR + A - MPR + \Delta T_{IBC}, P - MPR) - \Delta T_C\}.$$

At step S102, the user equipment 100 calculates an upper bound value of the transmission power of the user equipment 100. Specifically, the transmission power upper bound value calculation unit 120 calculates $P_{CMAX\_H}$ in accordance with the formula as follows, $$P_{CMAX\_H} = \mathrm{MIN}\{P_{EMAX}, P_{PowerClass}\}.$$

At step S103, the user equipment 100 calculates respective tolerances of the lower bound value and upper bound value calculated to compensate for the applied power relaxation factor. Specifically, the allowed transmission power range determination unit 130 determines the tolerances of the lower bound value and the upper bound value based on the correspondence information between the transmission power specified to compensate for reduction due to the power relaxation factor and the tolerances applied to the transmission power. Specifically, the allowed transmission power range determination unit 130 determines the tolerance $T(P_{CMAX\_L})$ of $P_{CMAX\_L}$ and the tolerance $T(P_{CMAX\_H})$ of $P_{CMAX\_H}$ based on the correspondence information specified to compensate for the reduction of $P_{CMAX}$ due to the power relaxation factor $\Delta T_{IBC}$.

At step S104, the allowed transmission power range determination unit 130 determines an allowed range of the transmission power based on the determined respective tolerances. In one embodiment, the allowed transmission power range determination unit 130 may determine the allowed range of the transmission power by enlarging the range of the transmission power specified by the lower bound value and the upper bound value by the determined tolerances of the lower bound value and the upper bound value. Specifically, the allowed transmission power range determination unit 130 determines the range of the measurement value $P_{UMAX}$ of the transmission power in accordance with the formula as follows, $$P_{CMAX\_L} - T(P_{CMAX\_L}) \le P_{UMAX} \le P_{CMAX\_H} + T(P_{CMAX\_H}).$$

At step S105, the user equipment 100 determines the transmission power for transmitting data within the determined range of the measurement value $P_{UMAX}$ of the transmission power.

In the case where CA is applied in a part of LTE bands, if a diplexer is introduced for introduction of CA and the tolerance of the maximum transmission power is relaxed by $\Delta T_{IBC}$ in a LTE band where the tolerance of the maximum transmission power is relaxed by $\Delta T_{LTE}$ due to the effect of the duplexer, $P_{CMAX\_L}$ is calculated in consideration of them both. Specifically, in this case, the power relaxation factor is $(\Delta T_{LTE} + \Delta T_{IBC})$, $P_{CMAX\_L}$ is calculated in accordance with the formula as follows, $$P_{CMAX\_L} = \mathrm{MIN}\{P_{EMAX} - \Delta T_C, P_{PowerClass} - \mathrm{MAX}(MPR + A - MPR + \Delta T_{LTE} + \Delta T_{IBC}, P - MPR) - \Delta T_C\}.$$

As already stated, respective transmission power ranges are corrected based on the above power relaxation factor. In this embodiment, by using correspondence information to compensate for reduction due to $\Delta T_{LTE} + \Delta T_{IBC}$ instead of the power relaxation factor $\Delta T_{LTE}$ as illustrated in FIG. 4, it is possible to avoid variations of the range of the measurement value $P_{UMAX}$ of the transmission power due to introduction of the power relaxation factor.

Although the embodiments of the present invention have been described above, the present invention is not limited to the above-stated specific embodiments, and various modifications and variations can be made within the spirit of the present invention as recited in claims.

This international patent application claims the benefit of priority based on Japanese Priority Application No. 2012-261725 filed on Nov. 29, 2012, the entire contents of which are hereby incorporated by reference.

LIST OF REFERENCE SYMBOLS

10: radio communication system
100: user equipment
110: transmission power lower bound value calculation unit
120: transmission power upper bound value calculation unit
130: allowed transmission power range determination unit
140: transmission power determination unit

The invention claimed is:

1. A user equipment comprising:
   a transmission power lower bound value calculation unit configured to calculate a lower bound value of transmission power of the user equipment by applying a power relaxation factor for relaxing the transmission power;
   a transmission power upper bound value calculation unit configured to calculate an upper bound value of the transmission power;
   an allowed transmission power range determination unit configured to calculate tolerances of the calculated lower bound value and upper bound value to compensate for the applied power relaxation factor and determine an allowed range of the transmission power based on the calculated tolerances; and
   a transmission power determination unit configured to determine the transmission power within the determined allowed range of transmission power,
   wherein the allowed transmission power range determination unit determines the allowed range of transmission power to compensate for the applied power relaxation factor.

2. The user equipment as claimed in claim 1, wherein the allowed transmission power range determination unit determines the allowed range of transmission power based on correspondence information between the transmission power and the tolerance applied to the transmission power, and the correspondence information is specified to compensate for reduction due to the power relaxation factor.

3. The user equipment as claimed in claim 2, wherein the allowed transmission power range determination unit determines a tolerance of the lower bound value and a tolerance of the upper bound value based on the correspondence information and determines the allowed range of transmission power by enlarging a range of the transmission power specified by the lower bound value and the upper bound value by the determined tolerances of the lower bound value and the upper bound value.

4. The user equipment as claimed in claim 1, further comprising:
   a filtering means for separating between a signal in a transmission frequency band and a signal in a reception frequency band,
   wherein the power relaxation factor is determined based on power tolerance characteristics of the filtering means.

5. A method in a user equipment, comprising:
   calculating a lower bound value of transmission power of the user equipment by applying a power relaxation factor for relaxing the transmission power;
   calculating an upper bound value of the transmission power;
   calculating tolerances of the calculated lower bound value and upper bound value to compensate for the applied power relaxation factor;
   determining an allowed range of the transmission power based on the calculated tolerances; and
   determining the transmission power within the determined allowed range of transmission power.

* * * * *